(12) United States Patent
Rueda-Núñez

(10) Patent No.: US 8,647,524 B2
(45) Date of Patent: Feb. 11, 2014

(54) CHEMICAL COMPOSITION FOR FIGHTING FOREST FIRES AND PROCESS FOR OBTAINING THEREOF

(76) Inventor: José Luis Rueda-Núñez, Michoacan (MX)

( * ) Notice: Subject to any disclaimer, the term of this patent is extended or adjusted under 35 U.S.C. 154(b) by 109 days.

(21) Appl. No.: 13/451,835

(22) Filed: Apr. 20, 2012

(65) Prior Publication Data

US 2012/0199781 A1 Aug. 9, 2012

Related U.S. Application Data

(63) Continuation-in-part of application No. PCT/MX2010/000113, filed on Oct. 20, 2010.

(30) Foreign Application Priority Data

Oct. 23, 2009 (MX) .................... MX/a/2009/011437

(51) Int. Cl.
*A62D 1/00* (2006.01)
*C09K 21/02* (2006.01)
*C09K 21/06* (2006.01)

(52) U.S. Cl.
USPC ............................... 252/2; 252/603; 252/607

(58) Field of Classification Search
USPC .............................................. 252/2, 603, 607
See application file for complete search history.

(56) References Cited

U.S. PATENT DOCUMENTS 3,843,525 A * 10/1974 Hattori et al. ..................... 252/2

FOREIGN PATENT DOCUMENTS

| ES | 2112181 A1 | 3/1998 |
| WO | 94/05737 A1 | 3/1994 |

OTHER PUBLICATIONS

International Search Report issued in PCT/MX2010/000113, dated Jul. 7, 2011.

* cited by examiner

*Primary Examiner* — Peter F Godenschwager
(74) *Attorney, Agent, or Firm* — Birch, Stewart, Kolasch & Birch, LLP

(57) ABSTRACT

Disclosed is a chemical composition that may be used to fight forest fires. Such composition may be applied by aerial means by discharge from aircraft. The composition may also be used to create fire breaks, which facilitates the actions of land-based firefighters.

13 Claims, No Drawings

CHEMICAL COMPOSITION FOR FIGHTING FOREST FIRES AND PROCESS FOR OBTAINING THEREOF

This application is a Continuation-In-Part of PCT International Application No. PCT/MX2010/000113, filed on Oct. 20, 2010, to which priority is claimed under 35 U.S.C. §120. This application also claims priority under 35 U.S.C. §119(a) to Mexican Application No. MX/a/2009/011437, filed in Mexico on Oct. 23, 2009. Each of the above applications is hereby expressly incorporated by reference.

BACKGROUND OF THE INVENTION

1. Field of the Invention

This application relates to a composition, method of making a composition and method for fighting and/or preventing forest fires.

2. Description of the Related Art

Patent publication number CN-1565673 of Jan. 19, 2005 relates to an non-combustible material for coating which contains cellulose fiber and calcium carbonate ($CaCO_3$), which material works as retardant of fire. It is packed in closed packages with alkaline closing of an alkaline fiber fabric. The industrial technology related to this material is complex and the investment is high and does not bear characteristics suitable to fight forest fires.

There exist other fire retardants that are used for fighting forest fires. One of the main components of such fire retardants is an urea derivative. However, such product, at high temperatures, delivers toxic gases such as ammonia, carbon dioxide, nitrogen oxidize and carbon oxide that can damage the flora and fauna.

One embodiment of the invention is directed to a chemical composition suitable for fighting forest fires. The composition is preferably necessarily a fire retardant and may not substantially contain urea and/or urea derivatives. In other words, the composition may be substantially free of urea and/or urea derivatives. Those of skill in the art are aware of the well-established scope of such urea derivatives. However, exemplary, but non-limiting derivatives of urea include derivatives formed by replacement of one or more hydrogen atom with a substituent, such as N,N'-dialkylurea, N-Acetyl-N-phenylurea, or 1-acetyl-1-phenylurea, isoalkylideneurea, 2-(N'-alkylureido)-1-naphthoic acid, or 2-(3-alkylureido)-1-naphthoic acid, allophanic acid, hydantoic acid, allophoyl, or bivalent radicals (ureylene), Alternatively, the composition may be substantially free of compounds, which upon contact with fire, produce gases having toxicity to flora or fauna, such as ammonia, carbon dioxide, nitrogen oxidize and carbon oxide.

One embodiment of the invention relates to a chemical composition containing cellulose fiber, water ($H_2O$), sodium chloride (NaCl), aluminum potassium sulfate, for instance, hydrated potassium aluminum sulfate (e.g., $KAl(SO_4)_2.12H_2O$), dolomite, starch (e.g., $(C_6H_{10}O_5)_n$, where n is about 300-600), and calcium carbonate ($CaCO_3$). The combination of said components and the process of elaboration results in a composition useful for fighting forest fires by extinguishing the fire, preventing the ignition and/or preventing re-ignition.

SUMMARY OF THE INVENTION

One object of the invention is to provide a composition different from the ones of the prior art. The composition is useful for fighting and effectively suffocating the forest fires. Moreover, the composition may be non-prejudicial for the environment.

The composition of the invention is useful for fighting and suffocating the forest fires in a quick and efficient way. By its use, thousands of hectares of forest can be prevented from being consumed by fire as well as material damage and loss of life. The composition may exhibit one or more of the features of being not flammable, being biodegradable, being not substantially damaging to the environment, and being beneficial to the soil of the forests (since it might enhance the physical, chemical and biological properties of the soil). Its use is may be quick, simple and efficient without risking lives.

One embodiment of the invention relates to a composition, which may be suitable for fighting forest fires, comprising: (a) cellulose fiber in an amount of from about 20% to about 30% by weight, based upon the total weight of the composition; (b) dolomite (e.g., calcium and magnesium carbonate $CaCO_3$—$MgCO_3$) in an amount from about 20% to about 30% by weight based upon the total weight of the composition; (c) Alum (e.g., aluminum and Potassium Sulfate $KAl(SO_4)_2.12H_2O$) in an amount from about 0.5% to about 4% by weight based upon the total weight of the composition; (d) starch (e.g., $(C_6H_{10}O_5)_n$, where n is about 300-600) in an amount from about 0.5% to about 2% by weight based upon the total weight of the composition; (e) calcium carbonate ($CaCO_3$) in an amount from about 0.5% to about 2% by weight based upon the total weight of the composition; and (f) an aqueous solution of sodium chloride in a concentration from about 1 to about 3% w/w based upon the total weight of the aqueous solution, in an amount from 40% to 55% by weight based upon the total weight of the composition.

In addition, one embodiment of the invention relates to a method for preparing a composition comprising the steps of: (i) preparing an aqueous solution of from about 0.5 to about 3% w/w of sodium chloride; (ii) removing about 15-25% (e.g., 20%) of the total volume of the aqueous sodium chloride solution and maintaining about 75-85% (e.g., 80%) of the total volume; (iii) adding, to the maintained (e.g., about 75-85%) volume fraction of aqueous sodium chloride solution, cellulose fiber (e.g., comminuted cellulose fiber) in an amount from about 20% to about 30% by weight based upon the total weight of the final composition; (iv) mixing under stirring the cellulose fiber and the about 80% of the total volume of the sodium chloride solution to obtain a blend of cellulose and the solution of sodium chloride; (v) keeping the blend of step (iv) under stirring for about 25-40 minutes to obtain a pulp that may have a grey color; (vi) adding ground dolomite in an amount from about 10% to about 15% by weight and ground Alum (aluminum and potassium sulfate $KAl(SO_4)_2.12H_2O$) in an amount from about 0.25% to about 2% by weight, based upon the total weight of the final composition to the pulp of step (v); (vii) keeping the resulting blend of step (vi) under stirring for about 10-25 minutes to obtain a pulp that may have a pearl color; (viii) adding, to the pulp of step (vii), ground calcium carbonate ($CaCO_3$) in an amount from about 0.5% to about 2% by weight and ground of Starch (e.g., $(C_6H_{10}O_5)_n$) in an amount from about 0.5% to about 2% by weight based upon the total weight of the final composition; (ix) keeping the resultant blend of step (viii) under stirring for about 10-25 minutes; (x) adding, to the product of step (ix), ground dolomite in an amount from about 10% to about 15% by weight and ground Alum (aluminum and potassium sulfate $KAl(SO_4)_2.12H_2O$) in an amount from about 0.25% to about 2% by weight based upon the total weight of the final composition; (xi) keeping the resultant blend of step (x) under stirring for between about 10-25 minutes; (xii) adding the remaining 20% of the total volume of the aqueous sodium chloride solution from step (ii) to the product of step (xi); and (xiii) keeping the resultant blend of step (xii) under stirring for between about 10-25 minutes.

DETAILED DESCRIPTION OF A PREFERRED EMBODIMENT

The characteristic details of this new chemical composition will be apparent in the following description:

The chemical composition characterized by its physic-chemical-composition may be mainly comprised of seven components. In other words, the composition may comprise, consist essentially of or consist of the components as recited herein.

The following Table 1 shows one embodiment of the percentages of the components of the chemical composition based on the total quantity of the composition.

TABLE 1

| COMPONENTS | % weight |
| --- | --- |
| Cellulose fiber | 20-30% |
| Aqueous Sodium chloride (NaCl) solution, concentration 1-3% w/w | 40-55% |
| Aluminum potassium sulfate | 0.5-4% |
| Dolomite | 20-30% |
| Starch | 0.5-2% |
| Calcium carbonate | 0.5-2% |

The cellulose fiber may have a characteristic of being thermally insulating, and may have an excellent aptitude to absorb and integrate all the components of the composition. In one embodiment, it is believed to act as regulator of humidity, and stands out its resistance to fire. Preferred, but non-limiting examples of cellulose fiber may include one or more of wood fiber or cardboard sawdust.

The aqueous solution of sodium chloride may as a solvent of the composition and increases the resistance of the composition to fire. The aqueous solution of sodium chloride has a concentration of sodium chloride of between about 1 to about 3% w/w, for example dissolving from 1-3 kg of sodium chloride in 100 liters of water; it is to say 100 kg of water assuming a water density of 1 kg/liter. The aqueous solution of sodium chloride represents between about 40 to about 55% of the total weight of the composition of the present invention. The composition of the invention may have the consistency of a fluid sludge that can be sprayed.

In one embodiment, alum is used in the composition, which specifically includes aluminum potassium sulfate, for example hydrated potassium aluminum sulfate (KAl(SO$_4$)$_2$.12H$_2$O). This ingredient the capacity of strengthening the efficiency of the chemical composition, it is believed that it works as water filter. The aluminum potassium sulfate, sometimes generally referred to as Alum, is commercialized in form of stones and may be ground to at least at a particle size of 1 mm in order to prepare the composition of the invention. Alum is commercialized for example by APROVAL SA DE CV.

Dolomite is a carbonate mineral composed of calcium magnesium carbonate CaMg(CO$_3$)$_2$. Generally, dolomite rock is composed of a blend of about 50% calcium carbonate (CaCO$_3$) and about 50% magnesium carbonate (MgCO$_3$). In some embodiments, the dolomite rock is composed predominantly of the mineral dolomite with a stoichiometric ratio of 50% or greater content of magnesium replacing calcium. Dolomite is commercialized for example, by Dolomita Agricola de Mexico, S. A. de C. V. Dolomite may increase the resistance of the composition of the invention to the fire. Dolomite may be ground to a suitable size for use in the present invention.

The starch (e.g., a polymer of C$_6$H$_{10}$O$_5$), may be beneficial to the soil increasing the development of roots, it might help to balance the acidity of the soils, might improve the physical, chemical and biological properties and improve the absorption of water and the assimilation of nutrients. The starch joins fast to organic matter and clays, and may be beneficial to the plants to store its nutrients and minerals in the roots.

Calcium carbonate (CaCO$_3$) may help to neutralize acids of the soil and to retain humidity without altering the physical and chemical properties. Calcium carbonate may be ground to a suitable size for use in the present invention.

In one embodiment, the present composition is useful to fight and to suffocate forest fires and does not damage the forests (e.g., is environmentally friendly). The above mentioned characteristics are listed below:

a) This chemical composition is applied in the forest fire fighting; it may suffocate the fire and quite possibly ring-finger ignition.

b) Other possible feature of this chemical composition is that when it is applied, it forms a coat that works forming a barrier (e.g., substantially impenetrable barrier) against the fire blocking the access of the oxygen to the organic matter that are the main component of the fire.

c) When it has been applied, the composition of the invention may retain and improve the absorption of water and nutrients by the soil; it might improve its physical, chemical and biological properties; as well as to stimulate the development of roots and to assist in the forest regeneration.

d) This chemical composition may be applied by means of air unloads which to the contact with the flames deactivate the ignition thus suffocating the fire and avoiding its spread.

e) This chemical composition may also be used for creating lines of firebreak making easier the action of the brigades in the combat of the fires providing safety and preventing human losses; the application also may be realized by air unloads.

For everything above previously mentioned it is possible to affirm that the prior features of this chemical composition have not been achieved by any other similar product.

In one embodiment, a process for the elaboration of the chemical comprises the following steps:

Step 1 the conditioning of the components.

Step 2 the preparation of the chemical composition.

Step 1. Conditioning of the Components.

A) It is provided a stirring in a container that works with an electrical motor, for example ¾ H. P., 1425 rpm and a speed reducer of 25%.

1. Preparation of an aqueous solution of sodium chloride.

1.1) It is prepared from 40% to 55% by weight of an aqueous solution of sodium chloride in a concentration from 1-3% w/w. by adding 1-3 kg of sodium chloride NaCl per 100 liters of water, under stirring.

1.2) continuing with the stirring up to totally dissolving the sodium chloride NaCl.

1.3) dividing the total volume in a first portion containing 75-85% by volume, and a second portion containing the remaining 15-25% of the volume of the total solution, for example 80-20 liters for each 100 liters prepared.

2. Preparation of the Dolomite.

The dolomite is ground to a size particle of at least 1 mm.

3. Preparation of the aluminum potassium sulfate KAl(SO$_4$)$_2$.12H$_2$O

The aluminum potassium sulfate $KAl(SO_4)_2 \cdot 12H_2O$ (Alum) is ground to a size particle of at least 1 mm.

Step 2. Preparation.

1. Mixing under stirring from 20% to 30% by weight of cellulose fiber with the first portion (75-85% volume) of the aqueous solution of Sodium Chloride.

The blend is kept under stirring for a period of 25-40 minutes up to reaching a pulp consistency of gray color.

2. Continuously adding 10-15% in weight of dolomite, as well as 0.25 to 2% in weight, of Alum (aluminum potassium sulfate, $KAl(SO_4)_2 \cdot 12H_2O$). Maintain the stirring for 10-25 minutes until the components join perfectly and form a homogeneous mixture. In this step the composition changes from gray color to a pearl color.

3. Add from 0.5 to 2% of starch ($C_6H_{10}O_5$) and 0.5 to 2% of calcium carbonate ($CaCO_3$) and keep constant stirring for 10-25 minutes up to the ingredients join totally and form a homogeneous mixture.

4. Adding 10-15% weight of dolomite as well as 0.25-2% of Alum (aluminum potassium sulfate $KAl(SO_4)_2 \cdot 12H_2O$) under stirring, keeping stirring for 10-25 minutes.

5. Add the remaining 15-25% in volume of the solution of sodium chloride in water, split out in step 1.3, and maintain stirring during 15 minutes up to its total incorporation.

6. The process takes at least 90 minutes in constant stirring in order to prepare the composition.

Results

In the following Table 2 the physic-chemical data of the chemical composition is shown.

TABLE 2

| PARAMETERS | |
|---|---|
| Color | Pearl and/or beige |
| Physical State | Viscous liquid |
| Density 25° C. gr/cm$^3$ | 1.04-1.12 |
| pH | 11.0-13.0 |
| % Solid | 15.0-21.0 |

This new chemical composition may be useful for fighting and suffocating forest fires, its efficiency lies in the direct application to the fire, which can be done by means of aircraft unloads, which works at the contact with the flames, extinguishing them in an immediate way and it does not allow re-ignition. It may also form efficient lines of firewall creating an impenetrable barrier for the fire, protecting and facilitating the action of the brigades, due to its composition features it suffocates and extinguishes the fire.

Follow several examples for fighting forest fires, applying the chemical composition.

Example 1

The following Table 3 is an exemplary composition of the invention:

TABLE 3

| Component | Quantity |
|---|---|
| Sodium chloride NaCl | 1 Kg |
| Water $H_2O$ | 50 Kg |
| Cellulose fiber | 25 Kg |
| Aluminum potassium sulfate $KAl(SO_4)_2 \cdot 12H_2O$ | 2 Kg |
| Dolomite | 25 Kg |

TABLE 3-continued

| Component | Quantity |
|---|---|
| Starch ($C_6H_{10}O_5$) | 1 Kg |
| Calcium carbonate ($CaCO_3$) | 1 Kg |
| TOTAL WEIGHT | 105 Kg |

According to Table 3 the solution of sodium chloride is in a concentration of 2% w/w.

A test was conducting using two shrubs, from 10 to 15 liters of the chemical composition of Table 3, were sprayed on the first shrub whilst no firefighting composition was sprayed on the second shrub. Then direct fire, at around 900° C., was applied to both shrubs, When fire was directed to the first shrub, the composition of the invention did not allow the combustion of the first shrub and formed a firewall unlike the second shrub which was immediately set aflame, being quickly consumed, within about 5 to 10 seconds.

| | Shrub without the chemical composition | Shrub with the chemical composition |
|---|---|---|
| Time in which the shrub catches fire | of 1 to 3 seconds | Did not catch fire |
| Time in which the fire consumes the shrub | of 5 to 10 seconds | Did not catch fire |

Example 2

In an area of approximately 3 m$^2$, dry bushes and branches were set aflame, then from 15 to 20 liters of the chemical composition of Table 3 were sprayed on the burning bushes and branches. As a result, the composition of the invention quickly extinguished the fire, within 5 to 10 seconds.

Then, after the chemical composition had suffocated the flames a direct fire was applied using the equipment of example 1, it can be verified that the chemical composition of the invention did not allow any possible re-ignition.

| | Time in extinguishing the fire on having sprayed the chemical composition to the Bushes and branches aflame | Time in restarting the fire on having applied direct fire to the bushes and branches after spraying the chemical composition |
|---|---|---|
| Dry bushes and branches aflame | From 5 to 10 seconds | Did not catch fire |

Example 3

In an area of 3 linear meters of dry bushes and branches was thrown 15 to 20 liters of the chemical composition of Table 3 forming lines of firebreak, then the bushes and branches adjacent were set aflame. When flames reached the bushes forming the firebreak with the chemical composition, the fire was extinguished, thus, preventing the fire spread.

The invention being thus described, may be varied in many ways. Such variations are not to be regarded as a departure from the spirit and scope of the invention, and all such modifications as would be obvious to one skilled in the art are to be included within the scope of the following claims.

What is claimed is:

1. A composition, comprising:
   cellulose fiber in an amount from about 20% to about 30% by weight based upon the total weight of the composition;
   dolomite in an amount from about 20% to about 30% by weight based upon the total weight of the composition;
   aluminum potassium sulfate in an amount from about 1% to about 4% by weight based upon the total weight of the composition;
   starch in an amount from about 0.5% to about 2% by weight based upon the total weight of the composition;
   calcium carbonate in an amount from about 0.5% to about 2% by weight based upon the total weight of the composition; and
   an aqueous solution of sodium chloride in an amount from about 40% to about 55% by weight based upon the total weight of the composition, wherein the concentration of sodium chloride in the aqueous solution is from about 1 to about 3% w/w based upon the total weight of the aqueous solution.

2. The composition of claim 1, wherein said composition is suitable for fighting forest fires.

3. The composition of claim 1, wherein said composition is substantially free of urea and/or urea derivatives.

4. A process for preparing the chemical composition of claim 1 for fighting forest fires, including the steps of:
   (i) preparing a solution of sodium chloride in water, wherein the concentration of sodium chloride in the solution is from about 1 to about 3% w/w based upon the total weight of the solution;
   (ii) removing about 15-25% of the total volume of the sodium chloride solution and maintaining about 75-85% of the total volume;
   (iii) adding, to the maintained volume of sodium chloride solution from step (ii), cellulose fiber in an amount from about 20% to about 30% by weight based upon the total weight of the final composition;
   (iv) mixing the resultant product of step (iii) to obtain a blend of cellulose and the sodium chloride solution;
   (v) stirring the blend of step (iv) for about 25-40 minutes;
   (vi) adding, to the resultant product of step (v), ground dolomite in an amount from about 10% to about 15% by weight and ground aluminum potassium sulfate in an amount from about 0.25% to about 2% by weight based upon the total weight of the final composition;
   (vii) stirring the blend of step (vi) for about 10-25 minutes;
   (viii) adding, to the resultant product of step (vii), ground calcium carbonate in an amount from about 0.5% to about 2% by weight and ground starch in an amount from about 0.5% to about 2% by weight based upon the total weight of the final composition;
   (ix) stirring the blend of step (viii) for about 10-25 minutes;
   (x) adding, to the resultant product of step (ix), ground dolomite in an amount from about 10% to about 15% by weight and ground of aluminum potassium sulfate in an amount from about 0.25% to about 2% by weight based upon the total weight of the final composition;
   (xi) stirring the blend of step (x) for between about 10-25 minutes;
   (xii) adding the remaining about 15-25% of the total volume of the sodium chloride solution of step (ii) to the resultant product of step (xi); and
   (xiii) stirring the blend of step (xii) for between about 10-25 minutes to obtain the final composition.

5. The method of claim 4, wherein said composition is substantially free of urea and/or urea derivatives.

6. A method for fighting fires, comprising:
   applying the composition of claim 1 to a fire.

7. The method of claim 6, wherein said fire is a forest fire.

8. A method for preventing fires or preventing the spread of fires, comprising:
   applying the composition of claim 1 to an area in need of fire prevention.

9. The method of claim 8, wherein said fire is a forest fire.

10. The method of claim 8, wherein said area in need of fire prevention is a fire break.

11. A composition prepared by mixing at least:
    cellulose fiber in an amount from about 20% to about 30% by weight based upon the total weight of the composition;
    dolomite in an amount from about 20% to about 30% by weight based upon the total weight of the composition;
    aluminum potassium sulfate in an amount from about 1% to about 4% by weight based upon the total weight of the composition;
    starch in an amount from about 0.5% to about 2% by weight based upon the total weight of the composition;
    calcium carbonate in an amount from about 0.5% to about 2% by weight based upon the total weight of the composition; and
    an aqueous solution of sodium chloride in an amount from about 40% to about 55% by weight based upon the total weight of the composition, wherein the concentration of sodium chloride in the aqueous solution is from about 1 to about 3% w/w based upon the total weight of the aqueous solution.

12. The composition of claim 11, wherein said composition is suitable for fighting forest fires.

13. The composition of claim 11, wherein said composition is substantially free of urea and/or urea derivatives.

* * * * *